(12) United States Patent
Shi et al.

(10) Patent No.: US 10,601,279 B2
(45) Date of Patent: Mar. 24, 2020

(54) PERMANENT MAGNET SYNCHRONOUS MOTOR AND ITS PREPARATION METHOD

(71) Applicant: Hanyu Group Joint-Stock Co., Ltd., Jiangmen (CN)

(72) Inventors: Huashan Shi, Jiangmen (CN); Likai Zheng, Jiangmen (CN); Hongbiao Wang, Jiangmen (CN); Shigang Dong, Jiangmen (CN); Changjian Li, Jiangmen (CN)

(73) Assignee: Hanyu Group Joint-Stock Co., Ltd., Jiangmen (CN)

( * ) Notice: Subject to any disclaimer, the term of this patent is extended or adjusted under 35 U.S.C. 154(b) by 217 days.

(21) Appl. No.: 15/329,068

(22) PCT Filed: Jul. 20, 2015

(86) PCT No.: PCT/CN2015/084467
§ 371 (c)(1),
(2) Date: Jan. 25, 2017

(87) PCT Pub. No.: WO2016/015572
PCT Pub. Date: Feb. 4, 2016

(65) Prior Publication Data
US 2018/0159401 A1 Jun. 7, 2018

(30) Foreign Application Priority Data
Jul. 28, 2014 (CN) .......................... 2014 1 0362395

(51) Int. Cl.
*H02K 5/128* (2006.01)
*H02K 21/02* (2006.01)
(Continued)

(52) U.S. Cl.
CPC ............ *H02K 5/128* (2013.01); *F04D 13/027* (2013.01); *F04D 13/06* (2013.01); *F04D 13/064* (2013.01);
(Continued)

(58) Field of Classification Search
CPC ........ H02K 21/00; H02K 21/02; H02K 21/18; H02K 21/185; H02K 3/30; H02K 3/44;
(Continued)

(56) References Cited

U.S. PATENT DOCUMENTS 3,390,289 A * 6/1968 Jager .................. H02K 5/04
310/156.12
4,469,965 A * 9/1984 Eckel .................. H02K 5/15
310/216.038
(Continued)

FOREIGN PATENT DOCUMENTS

| CN | 203261138 | 10/2013 |
|---|---|---|
| CN | 204013154 | 12/2014 |

*Primary Examiner* — Tran N Nguyen
(74) *Attorney, Agent, or Firm* — Greer, Burns & Crain, Ltd.

(57) ABSTRACT

A permanent magnet synchronous motor with an integrated pump body and its preparation method are provided. The preparation method comprises: 1) performing an injection molding process for the first time on a coil, which is wound on a coil former, to form a coil sealing part for sealing the coil; 2) assembling an iron core in the sealed coil and performing the injection molding process for the second time on them to form a pump body part with a rotor barrel, wherein the rotor barrel is formed by conducting the injection molding process based on the iron core, and an isolating thin layer is formed at a polar arc part of the iron core to isolate the iron core from a rotor cavity in the rotor barrel. A good electromagnetic property of the motor is ensured and the water leakage problem is solved.

18 Claims, 7 Drawing Sheets

(51) Int. Cl.
*F04D 13/06* (2006.01)
*F04D 13/02* (2006.01)
*H02K 21/18* (2006.01)
*H02K 3/52* (2006.01)
*H02K 15/12* (2006.01)
*H02K 3/30* (2006.01)
*H02K 3/44* (2006.01)
*H02K 5/02* (2006.01)
*H02K 1/27* (2006.01)

(52) U.S. Cl.
CPC .............. *H02K 3/30* (2013.01); *H02K 3/44* (2013.01); *H02K 3/524* (2013.01); *H02K 5/02* (2013.01); *H02K 15/12* (2013.01); *H02K 21/02* (2013.01); *H02K 21/185* (2013.01); *H02K 1/2706* (2013.01)

(58) Field of Classification Search
CPC .......... H02K 3/52; H02K 3/524; H02K 5/02; H02K 5/08; H02K 5/12; H02K 5/128; H02K 5/22; H02K 5/225; H02K 15/12; H02K 15/16; H02K 1/14; F04D 13/02; F04D 13/027; F04D 13/06; F04D 13/064; F04C 18/00; F04C 29/00; F04C 29/0085; F04C 29/045
See application file for complete search history.

(56) References Cited

U.S. PATENT DOCUMENTS

| | | | | |
|---|---|---|---|---|
| 4,691,132 | A * | 9/1987 | Bertram | H02K 21/185 310/156.15 |
| 5,001,379 | A * | 3/1991 | Katayama | H01F 5/04 310/194 |
| 5,118,977 | A * | 6/1992 | Bertram | H02K 7/1185 310/162 |
| 5,365,137 | A * | 11/1994 | Richardson | H02K 1/141 310/112 |
| 5,502,359 | A * | 3/1996 | Schemmann | H02K 3/18 310/179 |
| 5,767,606 | A * | 6/1998 | Bresolin | H02K 5/1285 310/162 |
| 5,927,249 | A * | 7/1999 | Ackermann | F02D 11/10 123/399 |
| 6,020,661 | A * | 2/2000 | Trago | H02K 5/08 29/596 |
| 6,109,589 | A * | 8/2000 | Ackermann | C03C 17/25 251/129.11 |
| 7,669,311 | B2 * | 3/2010 | Ionel | H02K 1/143 29/596 |
| 2004/0062664 | A1 * | 4/2004 | Weigold | F04D 13/0626 417/357 |
| 2009/0039723 | A1 * | 2/2009 | Marioni | H02K 21/185 310/152 |
| 2012/0169155 | A1 | 7/2012 | Jang et al. | |

\* cited by examiner

PERMANENT MAGNET SYNCHRONOUS MOTOR AND ITS PREPARATION METHOD

This application is the U.S. National phase application corresponding to PCT/CN2015/084467 which was assigned an international filing date of Jul. 20, 2015 and associated with publication WO 2016/015572 A1 and which claims priority to Chinese Application 201410362395 filed on Jul. 28, 2014, the disclosures of which are expressly incorporated herein.

FIELD OF THE INVENTION

This invention relates to a draining pump, especially to a permanent magnet synchronous motor with an integrated pump body which is applied to draining pumps of a washing machine and a dish-washing machine and its preparation method.

BACKGROUND OF THE PRESENT DISCLOSURE

CN201320745113.5 discloses a draining pump of the AC permanent magnet synchronous motor with an U-shaped iron core. However, during a test of the draining pump, since the iron core is not isolated from the rotor by a protective material, water entering the rotor cavity seeps into the iron core to lead its rusting, or water will seeps into the coil through the iron core to lead burning of the coil due to its short circuit. Moreover, water entering the rotor cavity will leaks outside the draining pump. Manufacturers suffer from the water leakage problem all the time.

In exiting technology, the AC permanent magnet synchronous motor has a structure of integrating the wound coil and the iron core with pump body by injection molding. Although it solves the technical problem of vibration noise during working of the draining pump, it does not solve the water leakage problem.

For example, an AC permanent magnet draining pump in current technology consists of an assembled coil and iron core, and a pump body formed by injection molding on the assembled coil and iron core and integrated with them. The pump body formed by injection molding has a rotor cavity for holding components of the rotor, and the polar arc part of the iron core and rotor barrel together form the rotor cavity. On the one hand, the pump body integrally formed by the injection molding avoids mutual movement of the iron core and the coil. On the other hand, since the internal surface of the rotor cavity is formed by the internal concave surface of the iron core and the rotor barrel together, and an air gap for the magnetic circuit between the permanent magnetic rotor and the iron core is very small, its electromagnetic efficiency is improved. However, it has the following disadvantages. After the draining pump works for a long time, a seal ring for preventing water from entering the rotor cavity wears out. In this case, water enters into the rotor cavity through the worn seal ring during working of the draining pump. After water enters the rotor cavity, it will seep into the iron core through the internal concave surface of the iron core exposing to the rotor cavity, which results in rust of the iron core. Along with rust increasing, the rotor may be jammed. In addition, if the plastic seal on rest surfaces except the internal concave surface of the iron core is poor, water entering the rotor cavity leaks through the space between laminations of the iron core, or the space between the iron core and the plastic, then leaks in the coil to lead to coil burning.

In order to avoid burnout of the coil or rusting of the iron core caused by the above-mentioned water leakage, a stainless steel barrel is provided in the rotor barrel in current technology to isolate the internal concave surface of the iron core from the permanent magnetic rotor. Although the stainless steel barrel prevents water entering the rotor cavity from contacting the iron core, its manufacturing process is complicated and its cost is high, and the electromagnetic efficiency is greatly reduced.

SUMMARY OF THE PRESENT INVENTION

On the one hand, the invention aims at overcoming the problems in the prior art and providing a preparation method of a permanent magnet synchronous motor with an integrated the pump body. By means of sealing the iron core and the coil in an injection molding container, it not only ensures the electromagnetic property of the product, but also prevents water entering the rotor cavity from seeping into the iron core which avoids iron core rusting and provides dual protection to avoid water entering the rotor cavity to leakage outside of the draining pump.

On the other hand, the present invention provides a permanent magnet synchronous motor with an integrated pump body.

In order to achieve the first purpose of this invention, it provides a preparation method of the permanent magnet synchronous motor with the integrated pump body which comprises steps to be conducted in the following sequence:

1) performing an injection molding process for the first time to a coil wound on a coil former to form a coil sealing part for sealing the coil;

2) assembling the iron core in the coil being sealed by the coil sealing part, and performing the injection molding process for the second time on the coil being sealed by the coil sealing part and an iron core to form a pump body part with a rotor barrel, wherein The rotor barrel is formed by injection molding based on the iron core, and during injection molding process for the second time, an isolated thin layer is formed on the polar arc part of the iron core to isolate the iron core from the rotor cavity in the rotor barrel.

There is a gap between the iron core and the sealed container of the coil, which is filled with the injection molding materials during the injection molding for the second time.

Moreover, the present invention provides a preparation method of a permanent magnet synchronous motor with an integrated pump body which comprises steps in the following sequence:

1) winding a coil on a coil former and assembling an iron core in the wound coil;

2) performing an injection molding process based on the wound coil and the iron core to form a coil sealing part of the for sealing the coil and a pump body part with a rotor barrel, wherein The rotor barrel is formed by the injection molding process based on the iron core, and during injection molding an isolated thin layer is formed at a polar arc part of the iron core to isolate the iron core from the rotor cavity in the rotor barrel.

There is a gap between the iron core and the wound coil which is filled with the injection molding materials during the injection molding.

During the injection molding process for forming the pump body part, the iron core is located with a mold locating piece so that the iron core is centrally aligned with the wound coil.

In particular, the iron core is U-shaped, including two parallel longitudinal sections and a horizontal section connecting one end of the longitudinal section. The mold locating piece includes the first locating piece and the second locating piece. The polar arc part is located at the other end of the longitudinal section and is provided with the first locating slot for installing the first locating piece. The second locating slot for installing the second locating piece is provided at the shoulder of the one end of the longitudinal section.

In particular, a groove is provided on the internal concave surface of the polar arc part of the iron core. When the isolating thin layer is formed by injection molding, the isolating thin layer with a root embedded in the groove is formed by the injection molding material flowing into the groove. The isolating thin layer fixes tightly to the internal concave surface by the root.

In order to achieve the second purpose of this invention, it provides a permanent magnet synchronous motor with a integrated pump body which is prepared by the above-mentioned preparation method, including a rotor assembly; a stator assembly including a coil wound on a coil former and an iron core assembled on the coil which is sealed by a coil sealing part; and a pump body part which is formed by conducting injection molding based on the stator assembly, wherein the pump body part includes: a rotor barrel formed by conducting injection molding based on the iron core, which is provided with a rotor cavity for arranging the rotor assembly; and an isolating thin layer formed by conducting injection molding at a polar arc part of the iron core for isolating the iron core from the rotor cavity.

In addition, the present invention also provides a permanent magnet synchronous motor with a integrated pump body which is prepared by the above-mentioned preparation method, including a rotor assembly; a stator assembly including a coil wound on a coil former and an iron core assembled on the coil; a coil sealing part and a pump body part which are formed by conducting injection molding based on the stator assembly, the coil wound on the coil former is sealed by the coil sealing part, wherein the pump body part includes: a rotor barrel formed by conducting injection molding based on the iron core, in which is provided with a rotor cavity for arranging the rotor assembly; and an isolating thin layer formed by conducting injection molding at a polar arc part of the iron core to isolate the iron core from the rotor cavity.

The iron core is U-shaped, including two longitudinal sections parallel to each other and a horizontal section connecting one end of the longitudinal section. The polar arc part is located at the other end of the longitudinal section. The first locating slot is provided for arranging the first locating piece and the second locating slot for arranging the second locating piece is provided at the shoulder of the end of the longitudinal section, so that the iron core is centrally aligned with the coil wound on the coil former.

In particular, a groove is provided on the internal concave surface of the polar arc part of the iron core. The isolating thin layer has a root embedded in the groove, through which the isolating thin layer is tightly fixed onto the internal concave surface.

The isolating thin layer integrates with the rotor barrel and cooperates with the internal surface of rotor to form a continuous rotor cavity.

In particular, with the isolating thin layer, the internal concave surface of the polar arc part could be close to the rotor cavity as much as possible. The thickness of the thinnest part of the isolating thin layer is between 0.2 mm and 0.75 mm.

The invention has technical effects as follows:

The iron core is integrated with the coil by conducting injection molding, which not only enhances the space utilization and improves heat dispersion of the motor, but also reduces the vibration noise.

With a plastic arc isolating layer as the isolating thin layer, the polar arc part of the iron core is isolated from the rotor cavity, and the thickness of the thinnest part of the isolating thin layer is 0.2 mm. It not only prevents water in the rotor cavity from seeping into the iron core and prevent water from leaking to the coil through iron core lamination so as to avoid iron core rusting and coil burning, but also reduces the air gap between the iron core and the rotor which greatly improves the motor performance.

Figure 1:
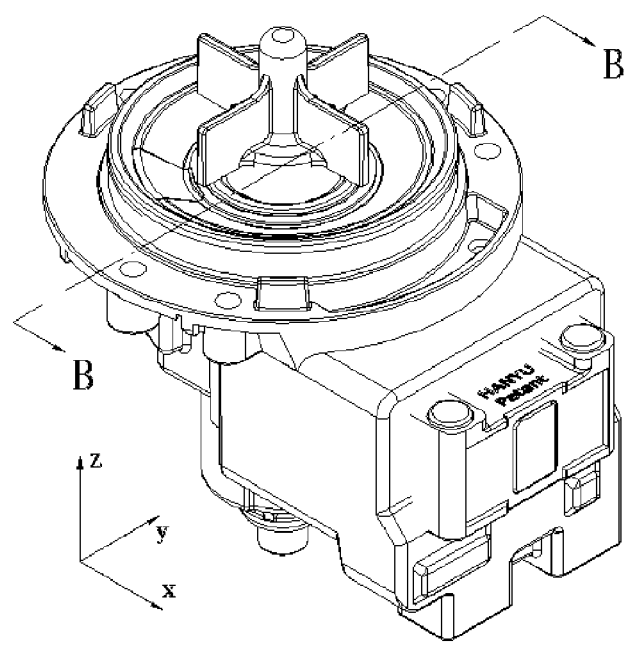
FIG. 1 is a structural view of a permanent magnet synchronous motor according to the present invention.

Description of figure signs: 11—coil sealing part; 12—iron core sealing part; 121—isolating layer of arc surface; 1210—root; 122—rest sealing parts; 122a and 122b—first locating holes; 124a and 124b—second locating holes; 123a and 123b—third locating holes; 125—fourth locating hole; 1—pump body part; 13—rotor barrel; 2—iron core; 21—longitudinal section; 21a and 21b—second locating slots; 22—horizontal section; 23—polar arc part; 231—internal concave surface; 2310—groove; 23a and 23b—first locating groove; 3—coil; 4—coil former; 5—rotor assembly; 50—rotor cavity; 61a and 61b—first sealing caps; 62a and 62b—second sealing caps; 63a and 63b—third sealing caps; 64—fourth sealing cap.

DETAILED DESCRIPTION

As shown in FIGS. 1, 2, 6 and 9, the permanent magnet synchronous motor of the present invention consists of a rotor assembly 5 including a permanent magnet rotor for driving an impeller to rotate, a stator assembly including a coil 3 wound on a coil former 4 and a iron core 2 assembled on the coil 3, and an integrated pump body formed by injection molding which is implemented by centering on the iron core 2 and the wound coil 3.

The integrated pump body of this invention is formed by conducting injection molding based on the coil and the iron core equipped on it. When injection molding is performed, the coil 3 wound on the coil former 4 and the iron core 2 equipped on it are sealed by injection molding material, with the plug end for connecting the coil to its external circuit being exposed. In this way, the iron core 2 and the coil 3 form a integral structure through injection molding which reduces vibration and noise. In particular, while the iron core 2 and the coil 3 are sealed by injection molding with a mold, the rotor barrel 13 is formed by injection molding which is conducted by centering on the iron core 2, and an isolating thin layer is formed at the polar arc part of the iron core which isolates the iron core from the rotor cavity in the rotor barrel.

Figure 6:
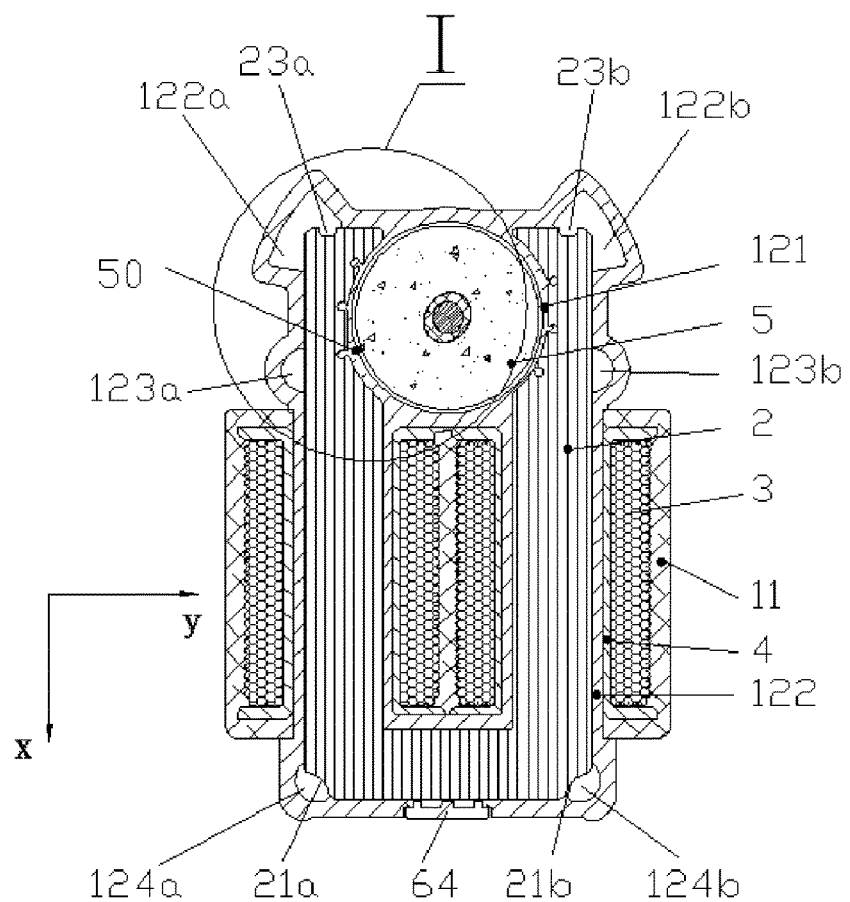
FIG. 6 is the section view along the A-A line in FIG. 2 of embodiment 1.
Figure 7:
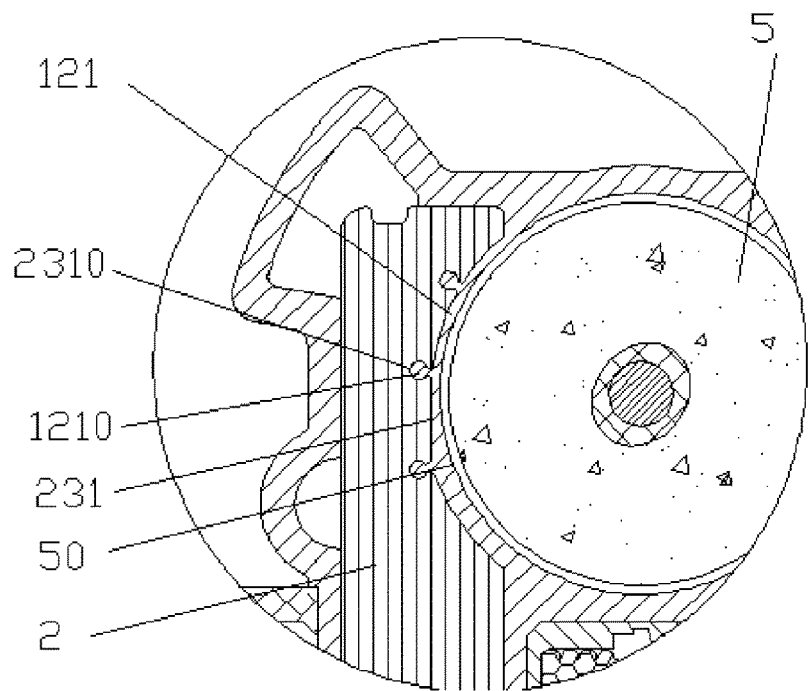
FIG. 7 is an enlarged view of Part I in FIG. 6.

The invention provides a rotor cavity 50 for installing the rotor assembly 5, which is formed in the inside of the polar arc part of both arms of the iron core 2 and is close to the internal concave surface 231. There is a thin isolating thin layer between the internal concave surface 231 at the polar arc part and the rotor cavity 50, i.e. the isolating layer of arc surface 121. In order to form a small air gap, a thickness range of the thinnest part of the isolating layer of arc surface is between 0.2 mm and 0.75 mm. As shown in FIG. 6 and FIG. 7, the thickness of the thinnest part of the isolating layer of arc surface 121 is only 0.5 mm. The isolating layer of arc surface 121 isolates the iron core 2 from the rotor cavity 50. Therefore, water entering the rotor cavity shall not seep into the iron core and the coil.

The integrated pump body of the invention can be obtained by an injection molding method of one-stage processing or an injection molding method of two-stage processing. Although structures of the integrated pump body formed by two methods are same, different injection molding processes and different injection molding materials may be adopted. Integrated pump body being obtained by one-stage and two-stage injection molding methods are explained respectively through following two examples.

IMPLEMENTATION EXAMPLE 1

In the implementation example 1, an integrated pump body is obtained by the two-stage injection molding method.

As shown in FIG. 2, FIG. 5a, FIG. 5b and FIG. 6, the integrated pump body consists of a coil sealing part 11 for sealing a coil 3 wound on a coil former 4, and a pump body part 1 formed by conducting injection molding based on the iron core as a skeleton. The pump body part 1 includes rotor barrel 13, in which there is a rotor cavity for arranging a rotor assembly; a iron core sealing part 12 for sealing the iron core 12, which has an isolating layer of arc surface 121 closely contacting the internal concave surface 231 of the iron core 2. When the pump body part 1 is formed, the isolating layer of arc surface 121 is integrated with the rotor barrel 13, and the internal surface of the rotor barrel 13 and the surface of the isolating layer of arc surface 121 together form the continuous rotor cavity 50.

Figure 5A:
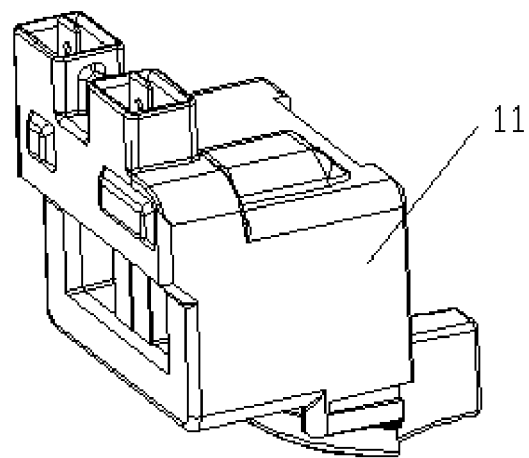
FIG. 5a is a schematic view of the coil wound on the coil former which is sealed by injection molding according to embodiment 1 of the present invention.

In this implementation example, when the integrated pump body is produced, the coil sealing part 11 and the pump body part 1 are formed successively by injection molding. The injection molding process is as follows:

Firstly, put the coil 3 wound on the coil former 4 into a mold to conduct an injection molding for the first time. After first injection molding, the coil sealing part 11 for sealing the coil 3 is formed, as shown in FIG. 5a. The coil sealing part 11 together with the coil former form a sealed container for sealing the coil 3, as shown in FIG. 6.

Figure 5B:
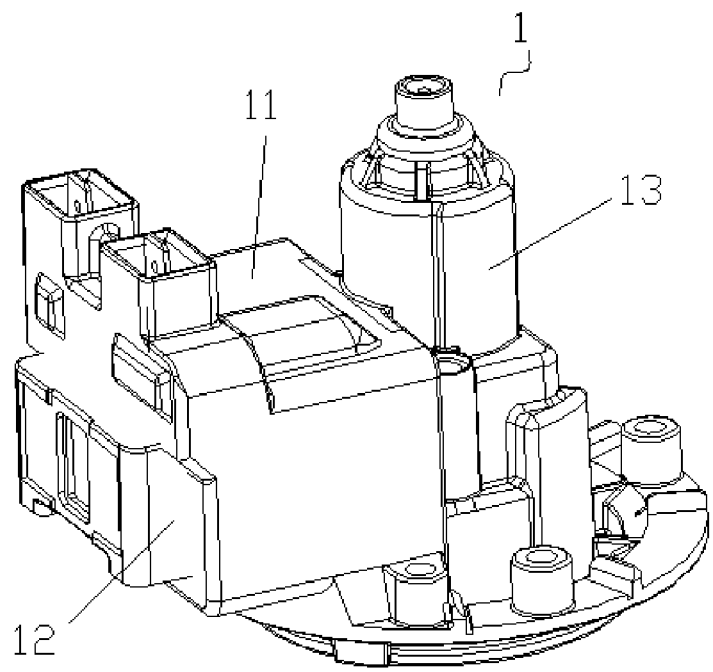
FIG. 5b is a schematic diagram of the iron core installed in the sealed coil which is sealed by injection molding according to the embodiment 1.

Then, assemble the iron core 2 in the coil 3 which is packaged in the coil sealing part 11, as shown in FIG. 5a, and put the coil 3 sealed by the coil sealing part and the iron core 2 into the mold to conduct the injection molding for the second time. During the injection molding for the second time, the pump body part 1 is formed by conducting the injection molding based on the assembled coil 3 and the iron core 2. It includes the rotor barrel 13 with a rotor cavity inside and the iron core sealing part 12 for sealing the iron core 2. The coil sealing part 11 is integrated with the rotor barrel 13 and the iron core sealing part 12 through the injection molding, as shown in FIG. 5b.

When an integrated pump body is formed through the two-stage injection molding, preferably, the coil sealing part 11 and the pump body part 1 are made of different plastic materials respectively. For example, since the coil sealing part directly contacts the coil, high fire rating is required. BMC has good thermal conductivity and is cheaper than PP, but has poorer plasticity. Therefore, the coil sealing part 11 uses the BMC material with high fire rating, while the pump body part 1 uses the general PP material with high plasticity. Of course, the coil sealing part 11 and the pump body part 1 may use the same plastic material.

The specific structure of this implementation example is described in detail below with combination of the Figures.

Figure 11:
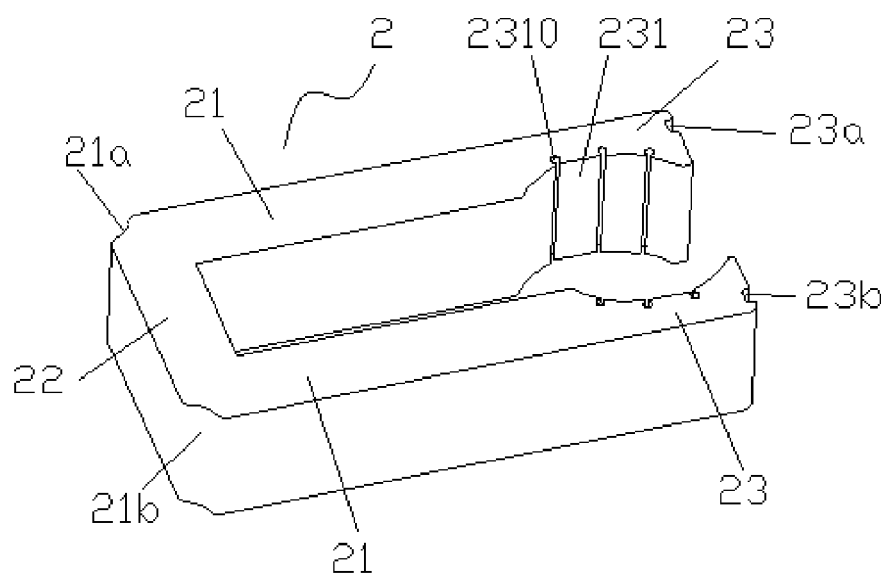
FIG. 11 is a structural view of the iron core with a groove according to the present invention.

As shown in FIG. 11, the iron core 2 is U-shaped and has two longitudinal sections 21 which are parallel and connected by the horizontal section 22, two arc parts 23 locating respectively at ends of two longitudinal sections, and each has the internal concave surface 231.

Figure 2:
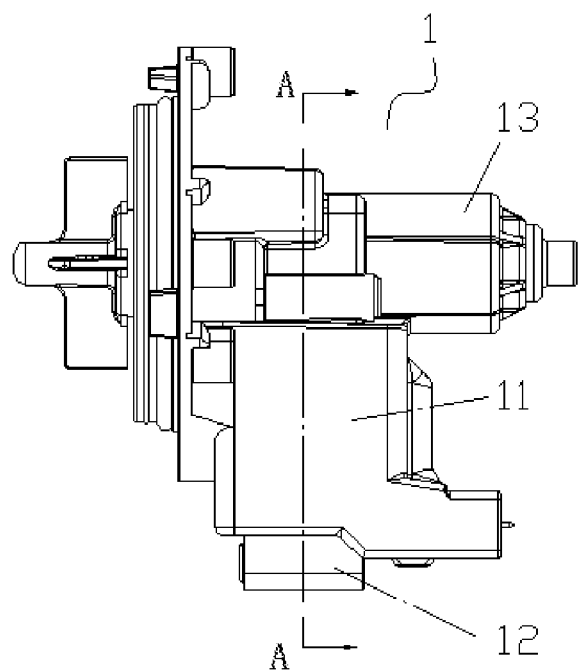
FIG. 2 is the front view of the permanent magnet synchronous motor according to the present invention.

The iron core sealing part 12 isolates the coil former 4 from the iron core 2 and seals the iron core 2, as shown in FIG. 2, FIG. 6 and FIG. 7. The iron core sealing part 12 includes the isolating layer of arc surface 121 closely contacting the internal concave surface 231 of the iron core 2, and rest sealing parts 122 for sealing the surface other than the internal concave surface of the iron core and isolating the coil former 4 from the iron core 2, as shown in FIG. 6. There is an air gap between the iron core 2 and the sealed container of the coil 3, and it is filled with the injection molding material when the iron core sealing part 12 is formed through the injection molding for the second time. Therefore, the isolating layer of arc surface 121 and injection molding material filled between the iron core and the coil sealing part provide dual protection for preventing water in the rotor cavity from leaking to the outside of the draining pump. When the pump body part 1 is formed through the injection molding, the isolating layer of arc surface 121 and internal surface of the rotor barrel 13 connecting with it jointly form a continuous rotor cavity 50 for arranging the rotor assembly.

Figure 8:
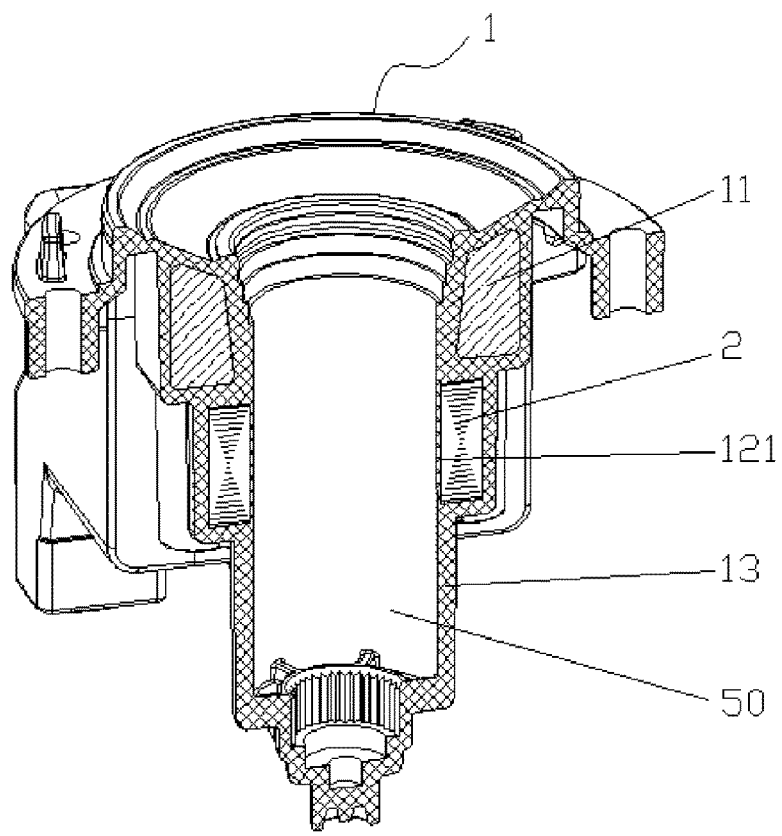
FIG. 8 is the section view along the B-B line in FIG. 1 of embodiment 1 in which the rotor assembly is not shown.

Since the iron core sealing part 12 and rotor barrel 13 for forming the pump body part are formed through one-stage injection molding, the isolating layer of arc surface 121 forming the iron core sealing part 12 connects with the rotor barrel 13, and there is no joint at the connection. Thus, a continuous internal surface of the rotor cavity is formed, as shown in FIG. 8. There is a continuous and complete layer of plastic without joint between the rotor cavity 50 and the iron core 2. It prevents water entering the rotor cavity 50 from seeping the iron core 2 and the coil 3 and prevents the draining pump from leaking water through the iron core.

As shown in FIG. 6 and FIG. 7, in order for the internal concave surface 231 of the polar arc part of the iron core to close to the rotor cavity 50 in the rotor barrel 13 to the greatest extent, and to minimize the air gap of the magnetic circuit between the iron core 2 and the permanent magnet rotor so as to get the higher electromagnetic efficiency, the thickness of the isolating layer of arc surface 121 between the internal concave surface 231 and rotor cavity 50 provided by this invention is very thin. Since the internal concave surface 231 of the iron core has two sections of arc surfaces with different radius, and it is required that the rotor cavity formed by injection molding should be a standard arc, the plastic material for forming the isolating layer of arc surface to seal the internal concave arc surface 231 has different thickness. The thickness range of the isolating layer of arc surface formed through injection molding of this invention is 0.5~0.65 mm, i.e. the minimum thickness of the isolating layer of arc surface 121 at the thinnest part is 0.5 mm and the maximum thickness is only 0.65 mm at the most thickest part.

As shown in FIG. 6, FIG. 7 and FIG. 8, since the isolating layer of arc surface 121 is thin, in order to ensure that such thin layer has enough strength and is fitted to the internal concave surface, the groove 2310 is arranged along the internal concave surface of the iron core. When the isolating layer of arc surface 121 is formed through injection molding, the injection molding material flows into the groove 2310 arranged along the internal concave surface of the iron core and forms the root 1210 extending from the isolating layer of arc surface 121. The root 1210 is embedded with the groove 2310, so that the isolating layer of arc surface 121 is reliably fixed on the internal concave surface 231.

Several grooves 2310 are arranged on the internal concave surface 231 of the iron core 2 in this implementation example. When the injection molding is performed, the melt plastic flows into the groove 2310. After cooling, it forms the root 1210 which is embedded into each groove 2310 from the isolating layer of arc surface 121 and closely matched with it. Through the root 1210 embedded into the groove 2310, the isolating layer of arc surface 121 is pulled and fixed on the internal concave surface 231.

Preferentially, in order to better pull the isolating layer of arc surface 121 through the root 1210 embedded with the groove 2310, the groove 2310 is a necking groove having a big inner cavity with a small opening, and its cross-section shape can be round or polygonal. In this implementation example, several grooves 2310, which axially run through, are symmetrically set on the internal concave surface 231 of two polar arc parts of the iron core 2, so that the isolating layer of the arc surface 121 bear uniform tensile force.

When the injection molding is conducted for the second time to form the pump body part with the rotor barrel based on the iron core, preheat the internal concave part of the iron core and then the plastic flow to the gap, so that the plastic flow more easily.

An assembly gap exists between the iron core 2 and the coil former 4 when the iron core is assembled to the coil winding. Therefore, when a plastic package mold is used to manufacture an integrated pump body in practice, the coil sealing part is exposed and directly contracts the mold for locating. It is necessary to fully locate the iron core to avoid that the coil and the iron core cannot be center aligned due to various external forces, so that the gap between the coil and the iron core is uniform and then the thickness of the plastic poured between the coil and iron core is uniform. Therefore, it is avoided that, along with extension of use duration, water entering the rotor cavity leaks through the thin plastic and seeps into the iron core and even the coil to result in damage of the draining pump.

Therefore, in this implementation example, when the iron core is sealed, it is positioned in a three-dimensional direction with a mold locating piece, so that the iron core with a plastic package and the coil is aligned centrally and thickness of the plastic between the coil former 4 and iron core is uniform.

During the process of injection molding, the mold locating piece is used to locate the iron core 2. Therefore, the iron core sealing part 12 obtained through injection molding is provided with a locating hole for installing the mold locating piece, and the shape of the locating hole is consistent with that of the mold locating piece.

Figure 3:
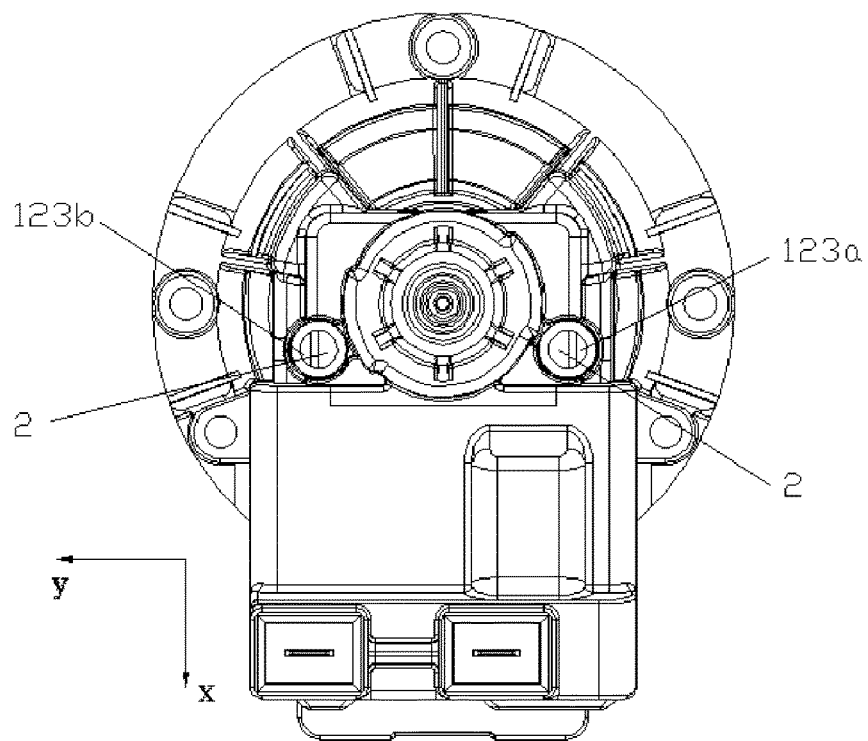
FIG. 3 is the right view of that shown in FIG. 2, in which a rotor assembly and a sealing cap is not shown.
Figure 4:
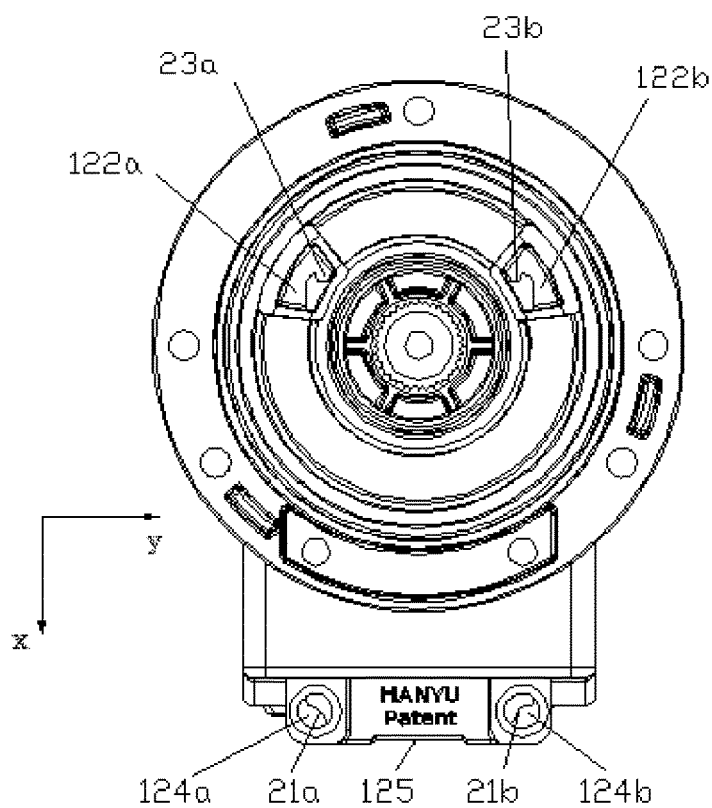
FIG. 4 is the left view of that shown in FIG. 2, in which the rotor assembly and the sealing cap are not shown.

Specifically, as shown in FIG. 3, FIG. 4 and FIG. 6, in this implementation example, three sets of locating holes are formed. Each set of locating hole is provided with two locating holes. Two locating holes of each set of locating hole are symmetrically arranged on both sides of the center line for aligning the iron core and the coil. With reference to the coordinate direction indicated in FIG. 1, a detailed description is provided for how to realize positioning in x, y and z directions of the iron core through mold locating pieces which form three sets of locating holes. It is assumed that the direction indicated by the arrow is the positive direction. The mold locating pieces include the first, second, third and fourth locating pieces.

As shown in FIG. 4 and FIG. 6, the first set of locating holes includes two first locating holes 122a and 122b, which are symmetrically formed at the shoulder of the end of two polar arc parts of the iron core. One of first locating holes surrounds three surfaces of the shoulder of the end of one polar arc part of the iron core. One first locating piece for forming one first locating hole 122a during injection molding contacts three surfaces of the shoulder of the end of one polar arc part, and applies forces to them in the x positive direction, the y positive direction and z negative direction. The other first locating hole 122b surrounds three surfaces of the shoulder end of the other polar arc part of the iron core. The other first locating piece for forming the other locating hole 122b during injection molding contacts three surfaces of the shoulder end of the other polar arc part, and applies forces to them in the x positive direction, y negative direction and z negative direction.

In order for that locating is firm, as shown in FIG. 4 and FIG. 6, the locating slot is provided at the end of the polar arc part of the iron core 2. It includes two first locating slots 23a and 23b which are symmetrically arranged at the shoulder end of two polar arc parts of the iron core, with one first locating slot 23a being clamped by one first locating piece for forming one first locating hole 122a and the other first locating slot 23b being clamped by the other first locating piece for forming the other locating hole 122b.

The second set of locating holes includes two second locating holes 124a and 124b which is formed at the external shoulder part of one end of two longitudinal sections of the iron core. Correspondingly, there are two second locating slots 21a and 21b which is provided at the external shoulder part of the other end of two longitudinal sections of the iron core 2.

As shown in FIG. 4 and FIG. 6, the second locating slots 21a and 21b is a concave corner with the internal concave surface. One second locating slot 21a corresponds to one second locating hole 124a. One second locating piece placed at one second locating slot 21a during injection molding forms a second locating hole 124a, and the one second locating piece applies force to the iron core through the one second locating slot 21a in the x negative direction, y positive direction and z negative direction. The other second locating slot 21b corresponds to the other second locating hole 124b. The other second locating piece is placed at the other second locating slot 21b during injection molding to form the other second locating hole 124b, and the other second locating part applies force to the iron core through the other second locating slot 21b in the x negative direction, y negative direction and z negative direction.

As shown in FIG. 3 and FIG. 6, the third set of locating holes includes two third locating holes 123a and 123b on both sides of the iron core. One third locating piece for forming one third locating hole 123a during injection molding applies force to the iron core through its one side in the y and z positive direction. The other third locating piece for forming the other third locating hole 123b during injection molding applies force to the iron core through its the other side in the y negative direction and z positive direction.

In addition, as shown in FIG. 4, in this implementation example, it also forms a fourth locating hole 125 in the middle of the horizontal section of the iron core. The fourth locating piece for forming the fourth locating hole 125 during injection molding applies force to the iron core in the x negative direction.

To sum up, through joint action of the first locating piece for forming the first locating hole, second locating piece for forming the second locating hole, third locating piece for forming the third locating hole and fourth locating piece for forming the fourth locating hole, it gets accurate positioning of the iron core, so that the plastic thickness of the iron core sealing part 12 obtained by this implementation example is uniform, and it has tight seal.

Figure 12:
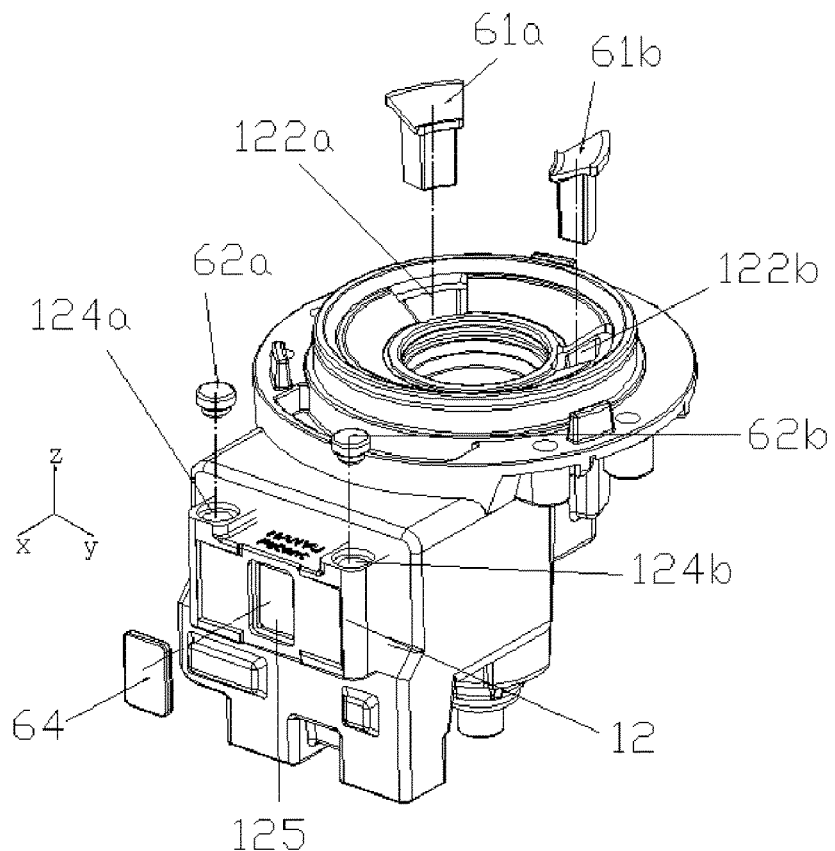
FIG. 12 and FIG. 13 are assembly diagrams of the locating hole and the sealing cap according to the present invention.
Figure 13:
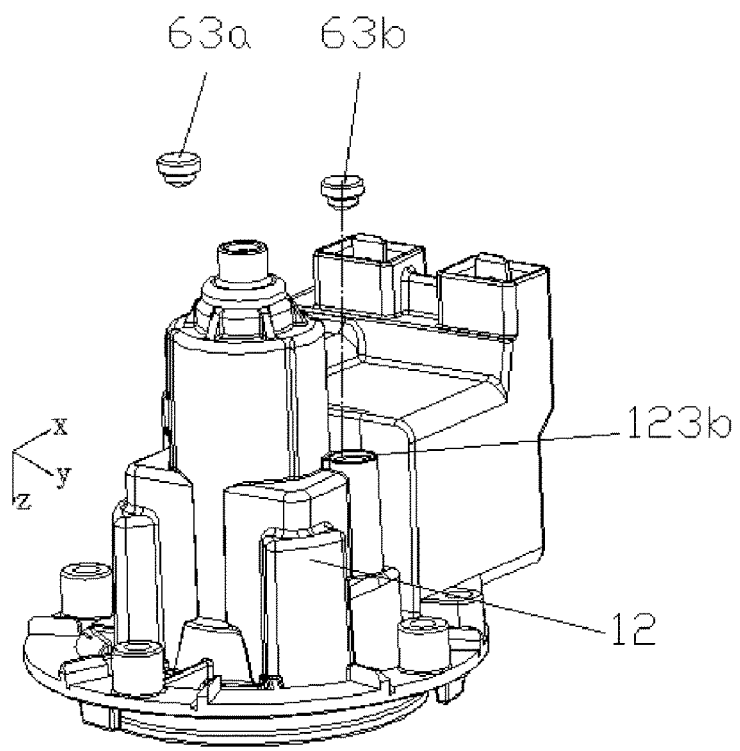

As shown in FIG. 12 and FIG. 13, locating caps 61a, 61b, 62a, 62b, 63a, 63b and 64 for sealing all locating holes are also provided on the iron core sealing part 12. They are welded to their corresponding locating holes through ultrasonic wave to seal the iron core sealing part 12. The first sealing caps 61a and 61b are installed in the locating holes 122a and 122b respectively. The second sealing caps 62a and 62b are installed in the two second locating holes 124a and 124b respectively. The third sealing caps 63a and 63b are installed in the two third locating holes 123a respectively. The fourth sealing cap 64 is installed in the fourth locating hole 125.

IMPLEMENTATION EXAMPLE 2

This implementation example provides an integrated pump body through a method of one-off injection molding.

When an integrated pump body is made in this implementation examples, the coil sealing part 11 and pump body part 1 with the iron core sealing part 12 and rotor barrel 13 are formed through one-off injection molding. The specific injection molding process is conducted as follows:

First, the coil 3 is winded onto the coil former and the iron core 2 is assembled onto the coil 3. Then, the assembled iron core and coil is placed in the mold for a injection molding. After the injection molding, the coil sealing part 11 for sealing the coil and the iron core sealing part 12 for sealing the iron core are formed, and the rotor barrel 13 is formed through injection molding based on the iron core 2. The coil former cooperates with a mould thimble to realize positioning of the coil, such as that disclosed in CN200710143209.3.

Figure 9:
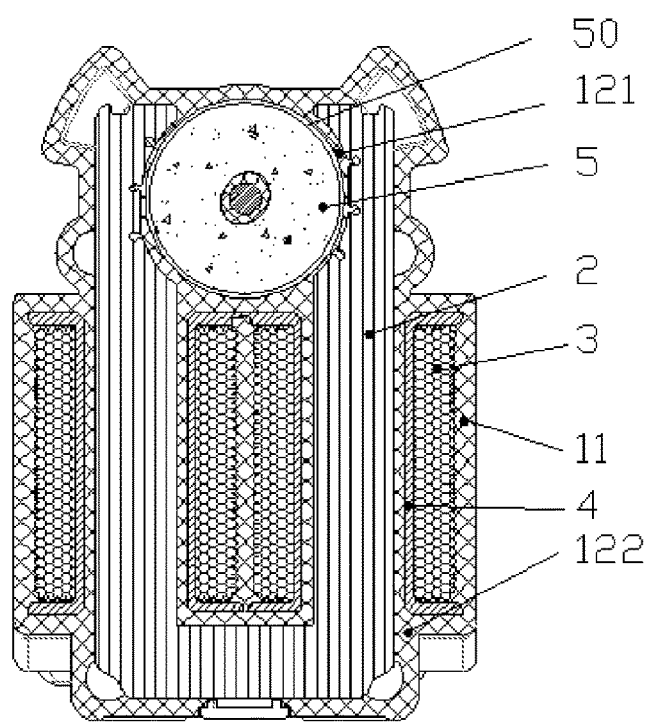
FIG. 9 is the section view along the A-A line in FIG. 2 of embodiment 2.
Figure 10:
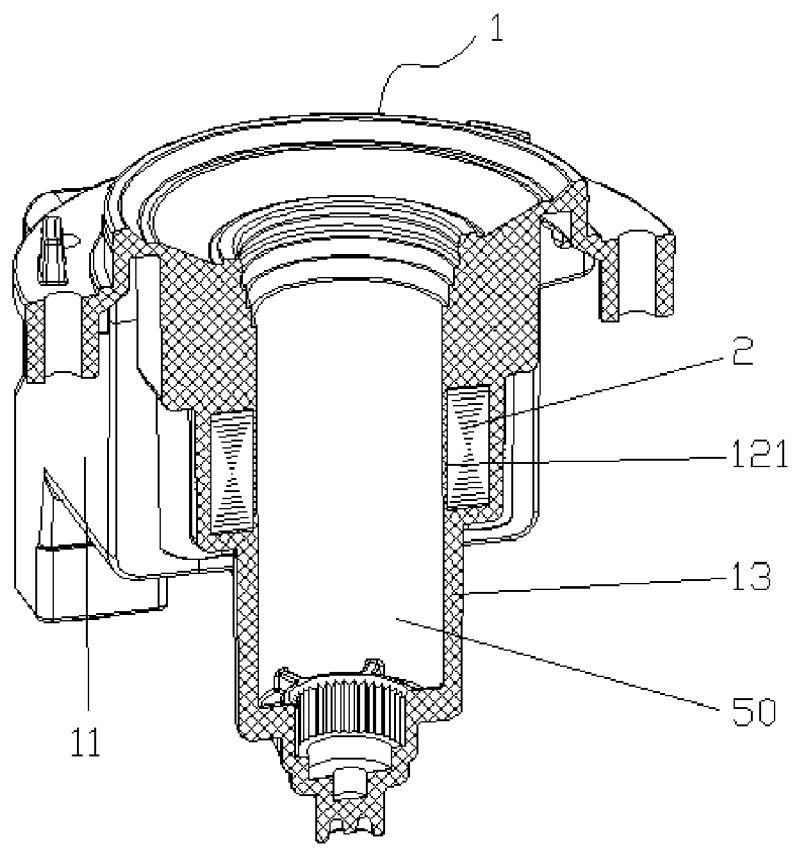
FIG. 10 is the section view along the B-B line in FIG. 1 of embodiment 2 in which the rotor assembly is not shown.

As shown in FIG. 2, FIG. 9 and FIG. 10, the coil sealing part 11, the iron core sealing part 12 and the rotor barrel 13, which are obtained through one-off injection molding, are formed to be an integrated structure.

As shown in FIG. 9, there is a gap between the iron core 2 and coil 4 being wound. It is filled with the injection molding material during the first injection molding. Therefore, the isolating layer of the arc surface 121 and injection molding material filled between the iron core and the coil provide two-layer protection for preventing water in the rotor cavity from leaking to outside of the draining pump.

Since this implementation example is formed through one-off injection molding, as shown in FIG. 9 and FIG. 10, the coil sealing part 11, the iron core sealing part 12 and the rotor barrel 13 are made of the same plastic material. For example, the coil sealing part 11, the iron core sealing part 12 and the rotor barrel 13 can be made of the BMC material with high fire rating, or PP material with high plasticity and high fire rating.

Since other structures of this implementation example are the same with those of the implementation example 1, they shall not be described in detail.

Although the present invention is described in detail as above, it is not limited to this. A person skilled in the art can make modifications to it according to its principles. Therefore, various modifications performed according to its principles shall be understood to fall into the protection scope of the present invention.

What is claimed is:

1. A preparation method of a permanent magnet synchronous motor with an integrated pump body comprises steps to be conducted in the following sequence:
    performing an injection molding process for a first time to a coil being wound on a coil former to form a coil sealing part for sealing the coil;
    assembling a U-shaped iron core in the coil being sealed by the coil sealing part, and performing the injection molding process for a second time on the coil being sealed and the U-shaped iron core to form a pump body part with a rotor barrel, wherein
    the rotor barrel is formed by the injection molding process based on the U-shaped iron core;
    during the injection molding process for the second time, an isolating layer of arc surface is formed on a pole arc part of the U-shaped iron core to isolate the U-shaped iron core from the rotor cavity in the rotor barrel; and wherein the isolating layer of arc surface integrates with the rotor barrel and cooperates with an internal surface of the rotor barrel to form a continuous rotor cavity.

2. A preparation method of a permanent magnet synchronous motor with an integrated pump body comprises steps in the following sequence:
    winding a coil on a coil former and assembling the U-shaped iron core in the wound coil;
    performing an injection molding process based on the wound coil and the U-shaped iron core to form a coil sealing part for sealing the coil and a pump body part with a rotor barrel, wherein
    the rotor barrel is formed by the injection molding process based on the U-shaped iron core;
    during the injection molding process an isolating layer of arc surface is formed on a pole arc part of the U-shaped iron core to isolate the U-shaped iron core from the rotor in the rotor barrel; and wherein the isolating layer of arc surface integrates with the rotor barrel and cooperates with an internal surface of the rotor barrel to form a continuous rotor cavity.

3. The preparation method according to claim 1, wherein:
during the injection molding process to form the pump body part, the U-shaped iron core is located with a mold locating piece so that the U-shaped iron core is centrally aligned with the wound coil.

4. The preparation method according to claim 3, wherein:
the U-shaped iron core includes two parallel longitudinal sections and a horizontal section connecting one end of the longitudinal sections, the pole arc part is located at the other end of the longitudinal sections and is provided with a first locating slot for installing a first locating piece, and a second locating slot for installing a second locating piece is provided at a shoulder of a one end of the longitudinal section.

5. The preparation method according to claim 1, wherein:
a groove is provided on the internal concave surface of the pole arc part of the U-shaped iron core, during the injection molding process for forming the isolating layer of arc surface, a root of the isolating layer of arc surface embedded in the groove is formed by the injection molding material flowing into the groove, and the isolating layer of arc surface is fixed to the internal concave surface by means of the root.

6. The preparation method according to claim 1, wherein:
there is a gap between the U-shaped iron core and a sealed container of the coil, and the gap is filled with injection molding materials during the injection molding process for the second time.

7. The preparation method according to claim 2, wherein:
there is a gap between the U-shaped iron core and the wound coil, and the gap is filled with injection molding materials during the injection molding process.

8. A permanent magnet synchronous motor with an integrated pump body comprises:
a rotor assembly,
a stator assembly including a coil being wound on a coil former and being sealed by a coil sealing part and a U-shaped iron core assembled on the coil, and
a pump body part which is formed by conducting an injection molding process based on the coil being sealed and the U-shaped iron core, wherein the pump body including:
a rotor barrel formed through the injection molding process based on the U-shaped iron core, which is provided with a rotor cavity for arranging the rotor assembly, and
an isolating layer of arc surface being formed by conducting the injection molding process at the pole arc part of the U-shaped iron core to isolate the U-shaped iron core from the rotor cavity; and wherein the isolating layer of arc surface integrates with the rotor barrel and cooperates with an internal surface of the rotor barrel to form a continuous rotor cavity.

9. A permanent magnet synchronous motor with an integrated pump body comprises:
a rotor assembly,
a stator assembly including a coil wound on the coil former and a U-shaped iron core assembled on the coil, and
a coil sealing part and a pump body part, both which are formed by conducting an injection molding process based on the coil wound on the coil former and the U-shaped iron core assembled on the coil, the coil being wound on the coil former is sealed by the coil sealing part, wherein the pump body part includes:
a rotor barrel formed by conducting the injection molding process based on the U-shaped iron core, which is provided with a rotor cavity for arranging the rotor assembly, and
an isolating layer of arc surface being formed by conducting the injection molding process at a pole arc part of the U-shaped iron core to isolate the U-shaped iron core from the rotor cavity; and wherein the isolating layer of arc surface integrates with the rotor barrel and cooperates with an internal surface of the rotor barrel to form a continuous rotor cavity.

10. The permanent magnet synchronous motor according to claim 8, wherein:
the U-shaped iron core includes two parallel longitudinal sections and a horizontal section connecting one end of the longitudinal sections, the pole arc part is located at the other end of the longitudinal sections and is provided with a first locating slot for installing a first locating piece, a second locating slot for installing a second locating piece is provided at a shoulder of a one end of the longitudinal sections so that the U-shaped iron core is centrally aligned with the coil wound on the coil former.

11. The permanent magnet synchronous motor according to claim 8, wherein:
a groove is provided on the internal concave surface of the pole arc part of the U-shaped iron core, the isolating layer of arc surface has a root embedded in the groove so that it is fixed onto the internal concave surface by the root,
the isolating layer of arc surface integrates with the rotor barrel and cooperates with the internal surface of the rotor barrel to form a continuous rotor cavity.

12. The permanent magnet synchronous motor according to claim 11, wherein
a thickness of a thinnest part of the isolating layer of arc surface is between 0.2 and 0.75 mm.

13. The preparation method according to claim 2, wherein:
during the injection molding process to form the pump body part, the U-shaped iron core is located with a mold locating piece so that the U-shaped iron core is centrally aligned with the wound coil.

14. The preparation method according to claim 2, wherein:
the U-shaped iron core includes two parallel longitudinal sections and a horizontal section connecting one end of the longitudinal sections, the pole arc part is located at the other end of the longitudinal sections and is provided with a first locating slot for installing a first locating piece, and a second locating slot for installing a second locating piece is provided at a shoulder of a one end of the longitudinal section.

15. The preparation method according to claim 2, wherein:
a groove is provided on the internal concave surface of the pole arc part of the U-shaped iron core, during the injection molding process for forming the isolating layer of arc surface, a root of the isolating layer of arc surface embedded in the groove is formed by the injection molding material flowing into the groove, and the isolating layer of arc surface is fixed to the internal concave surface by means of the root.

16. The permanent magnet synchronous motor according to claim 9, wherein:
the U-shaped iron core includes two parallel longitudinal sections and a horizontal section connecting one end of the longitudinal sections, the pole arc part is located at the other end of the longitudinal sections and is provided with a first locating slot for installing a first locating piece, a second locating slot for installing a second locating piece is provided at a shoulder of a one end of the longitudinal sections so that the U-shaped iron core is centrally aligned with the coil wound on the coil former.

17. The permanent magnet synchronous motor according to claim 9, wherein:
   a groove is provided on the internal concave surface of the pole arc part of the U-shaped iron core, the isolating layer of arc surface has a root embedded in the groove so that it is fixed onto the internal concave surface by the root,
   the isolating layer of arc surface integrates with the rotor barrel and cooperates with the internal surface of the rotor barrel to form a continuous rotor cavity.

18. The permanent magnet synchronous motor according to claim 17, wherein
   a thickness of a thinnest part of the isolating layer of arc surface is between 0.2 and 0.75 mm.

\* \* \* \* \*